United States Patent
Frick et al.

(10) Patent No.: US 9,702,478 B2
(45) Date of Patent: Jul. 11, 2017

(54) SERVO VALVE

(71) Applicant: Liebherr-Aerospace Lindenberg GmbH, Lindenberg/Allgäu (DE)

(72) Inventors: Joern Frick, Waldburg (DE); Anton Gaile, Leutkirch (DE); Franz Weixler, Kempten (DE)

(73) Assignee: Liebherr-Aerospace Lindenberg GmbH, Lindenberg/Allgäu (DE)

( * ) Notice: Subject to any disclaimer, the term of this patent is extended or adjusted under 35 U.S.C. 154(b) by 322 days.

(21) Appl. No.: 13/766,080

(22) Filed: Feb. 13, 2013

(65) Prior Publication Data
US 2013/0221253 A1    Aug. 29, 2013

(30) Foreign Application Priority Data
Feb. 14, 2012   (DE) .................. 10 2012 002 921

(51) Int. Cl.
| | |
|---|---|
| F16K 11/07 | (2006.01) |
| F16K 31/42 | (2006.01) |
| F15B 13/04 | (2006.01) |
| F15B 13/043 | (2006.01) |

(52) U.S. Cl.
CPC .......... *F16K 31/42* (2013.01); *F15B 13/0402* (2013.01); *F15B 13/0433* (2013.01)

(58) Field of Classification Search
CPC ... B63H 25/28; F15B 9/00; F15B 9/17; F15B 13/0438; F15B 13/0402; F15B 13/0433; F16K 5/162; F16K 27/062; F16K 5/163; F16K 31/42; Y10T 137/8663; Y10T 137/8662; Y10T 137/86574; Y10T 137/7036

USPC ............. 137/375, 625.2, 625.65, 625.66
See application file for complete search history.

(56) References Cited

U.S. PATENT DOCUMENTS

| | | | | |
|---|---|---|---|---|
| 2,547,929 | A | * | 4/1951 | Dawson ............... F15B 13/04 137/625.23 |
| 2,620,150 | A | * | 12/1952 | Atwood et al. ............. 244/82 |
| 2,964,018 | A | * | 12/1960 | Farron .................. 137/625.61 |
| 2,970,575 | A | * | 2/1961 | Stern .................... 137/625.64 |
| 2,995,893 | A | * | 8/1961 | Morris et al. .............. 60/246 |

(Continued)

FOREIGN PATENT DOCUMENTS

| | | |
|---|---|---|
| DE | 10 89 602 B | 9/1960 |
| DE | 1798427 | 5/1973 |

(Continued)

*Primary Examiner* — Craig J Price
(74) *Attorney, Agent, or Firm* — Dilworth & Barrese, LLP

(57) ABSTRACT

The invention relates to a servo valve, in particular a two-stage or multistage electrohydraulic servo valve, having a first stage which works as a pilot stage, and a second stage which works as a power stage, wherein the second stage has a valve block and a control slide valve sleeve arranged therein and having a jacket surface (18), wherein the jacket surface and/or another region of the control slide valve sleeve is preferably provided with at least one flow passage for transferring control flow and/or volume flow, and wherein a control slide valve is movably arranged in the control slide valve sleeve, wherein at least one of the flow passages is formed by a groove which is arranged in the surface of the control slide valve sleeve and which does not extend sectionally or overall in the peripheral direction of the control slide valve sleeve.

16 Claims, 1 Drawing Sheet

(56) References Cited

U.S. PATENT DOCUMENTS

| | | | | |
|---|---|---|---|---|
| 3,003,476 | A | * | 10/1961 | Thomas .................. 137/625.63 |
| 3,090,396 | A | * | 5/1963 | Rudelick ....................... 137/375 |
| 3,095,002 | A | * | 6/1963 | Healy ............................. 137/85 |
| 3,223,104 | A | * | 12/1965 | Cox et al. ....................... 137/85 |
| 3,282,168 | A | | 11/1966 | Hayner et al. |
| 3,857,541 | A | * | 12/1974 | Clark ......................... 251/30.05 |
| 3,952,775 | A | * | 4/1976 | Ogata .................... F16K 11/07 |
| | | | | 137/625.38 |
| 4,050,476 | A | * | 9/1977 | Hayner et al. .......... 137/625.62 |
| 4,450,875 | A | * | 5/1984 | Simson et al. .......... 137/624.18 |
| 4,664,152 | A | * | 5/1987 | O'Mara ................. F15B 13/04 |
| | | | | 137/454.2 |
| 5,467,800 | A | * | 11/1995 | Sallas ................. F15B 21/125 |
| | | | | 137/624.13 |
| 8,047,222 | B2 | * | 11/2011 | Lent et al. .................... 137/375 |
| 2004/0144433 | A1 | | 7/2004 | Hattori et al. |
| 2007/0251578 | A1 | * | 11/2007 | McGuire ...................... 137/375 |

FOREIGN PATENT DOCUMENTS

| | | |
|---|---|---|
| DE | 2452095 A1 | 5/1976 |
| DE | 102009049493 A1 | 4/2011 |
| JP | S63-187788 U | 12/1988 |

\* cited by examiner

US 9,702,478 B2

SERVO VALVE

BACKGROUND OF THE INVENTION

The present invention relates to a servo valve, in particular to a two-stage or multistage electrohydraulic servo valve, in accordance with the preamble of claim 1.

Particularly high demands are today made on the operating behavior of the installed hydraulic components within a hydraulic system in hydraulic system engineering. The installed hydraulics should in particular regulate specific hydraulic volume flows or hydraulic volume pressures with high precision in accordance with predefined control signals. Valves suitable for this purpose, in particular continuous valves, allow a continuous transition of the switch positions of the valve to be permitted.

With continuous valves, an electrical input signal for controlling the continuous valve is accordingly converted into a hydraulic output signal. The long-known servo valves belong to a category of continuous valves and allow a highly precise and above all continuous setting of the valve switch position, which is in particular considered a basic requirement in modern aviation technology.

So-called two-stage electrohydraulic servo valves (EHSV) are known from the prior art which comprise a first stage, the so-called pilot stage, and a second stage, the so-called power stage. The power stage in this respect has a control slide valve which remains in its position or is moved depending on the pressures acting on it. The electrically controllable pilot stage can have an armature which rotates in dependence on a magnetic field and in this respect varies the pressure relationships at the control slide valve via a jet pipe principle. The deflection of the control slide valve is thereby effected, i.e. the pilot stage serves the controlling of the power stage, i.e. a controlled deflection of the control slide valve, by means of which a volume flow to a component to be controlled dependent on the position of the control slide valve is released or blocked or is set in its magnitude. The servo valves can selectively also be configured or work according to the jet pipe principle, flapper nozzle principle or the deflector jet principle or also according to any other possible operating principle.

Such an electrohydraulic servo valve is shown schematically in FIG. 1. The control slide valve of the power stage is moved to and fro proportionally to the electrical input signal by means of the volume flow by deflecting the pilot stage. The control slide valve then controls exactly the volume flow to a consumer, such as an actuator, connected to the servo valve.

In the previously known servo valves, the valve blocks of the power stage are provided with connection bores and crossholes and the control slide valve sleeve is provided with punctures to transport the hydraulic fluid to the desired interfaces.

Since crossholes and connection bores are applied in the valve blocks of the power stage, the bores subsequently have to be closed from the outside by press-fit plugs or screw plugs to obtain a closed circuit, with hydraulic circuits arising due to the sealing. However, this embodiment of the previously known servo valves has proved to be disadvantageous. Such a servo valve is known from US 2004/0144433 A1.

A further disadvantage of previously known servo valves is that laterally deflected connection punctures have to be provided in the valve block to obtain a transition from the connection bores and crossholes to the control slide valve sleeve. These connection punctures are cut in using a side milling cutter so that grooves arise. However, the arising grooves have a critical fatigue behavior and endurance behavior and, apart from this, have to be deburred in a complex and/or expensive manner.

Furthermore, the valve blocks in the previously known servo valves cannot have a compact construction since sufficient materials have to be present for connection bores and crossholes and also for the press-fit plugs.

A further disadvantage of the known servo valves is that, depending on the system pressure and on the weight limit, the valve blocks are produced from aluminum, titanium or steel, which is very cost-intensive in view of the variety of variants. Additional expenses are also caused by bores for the press-fit plugs, with the plurality of external seals additionally increasing the risk. The higher number of individual parts of the servo valve results in a lower reliability, on the one hand, and in an increase in the manufacturing costs, on the other hand.

SUMMARY OF THE INVENTION

It is therefore the object of the present invention to provide an electrohydraulic servo valve of the initially named kind which has a simplified and simultaneously operationally safer design and by which the manufacturing effort and the costs can be substantially reduced.

This object is achieved in accordance with the invention by an electrohydraulic servo valve having the features herein.

The electrohydraulic servo valve in accordance with the invention has a first stage, which works as a pilot stage, and a second stage, which works as a power stage, with the second stage having a control slide valve sleeve with a jacket surface, with the jacket surface and/or another section of the control slide valve sleeve preferably being provided with at least one flow passage for transferring control flow and/or volume flow. A control slide valve is furthermore movably attached in the control slide valve sleeve. Control flow is understood as a flow of a fluid which serves the moving of the control slide valve; volume flow is understood as the flow of a fluid which serves the moving of the component to be controlled by means of the servo valve. This means that the control slide valve sleeve has at least one passage leading from and/or to the control slide valve and/or at least one passage leading from and/or to the consumer.

Provision is made in accordance with the invention that at least one of the named flow passages is formed in groove-shape and extends in the surface of the control slide valve sleeve. This at least one groove-shaped flow passage does not extend in the peripheral direction of the control slide valve at least sectionally, i.e. not over a part region or also over its total length. "Peripheral direction" is to be understood as the direction which extends along the periphery of the control slide valve sleeve and perpendicular to its longitudinal axis. At least one of the groove-shaped flow passages in the jacket surface of the control slide valve sleeve extends sectionally or in total in a different direction, e.g. in the direction of the longitudinal axis of the control slide valve sleeve, at an angle of <90° or >90° relative to this longitudinal axis, i.e. obliquely, etc. The present invention thus differs from control slide valve sleeves in which the flow passage or passages are arranged in ring form and extend in the peripheral direction of the control slide valve sleeve.

The pilot stage can, as described above, have an electromagnet which moves an armature, which is preferably electrically supported and rotated, in dependence on the electrical current. A hydraulic jet is thereby deflected and the pressure conditions at the control slide valve depend on the position of said jet. The control slide valve can thus be moved in dependence on the electric signal and can control a volume flow to and/or from a consumer in dependence on its position. This is, however, only one conceivable embodiment. Any other desired configurations of the pilot stage such as the jet pipe principle, the flapper nozzle principle or the deflector jet principle and other conceivable variants are also covered by the invention.

The side milling cutter punctures known from the prior art and the distribution bores in the valve block become superfluous due to the formation in accordance with the invention of the control slide valve sleeve with at least one flow passage and preferably with a plurality of flow passages. They can preferably be dispensed with. The volume flow and control flow is only or also transferred via the passages which are applied on the control slide valve sleeve and which are preferably formed in groove-shape. The control slide valve is in this respect suitable to control exactly the volume flow to a consumer, in particular to an actuator. In this respect, the valve block has a good fatigue behavior and endurance behavior. A seal with press-fit plugs can also be omitted in the solution in accordance with the invention.

The valve block preferably does not have any control passages which serve the control of the control slide valve or has fewer such control passages than known arrangements.

The valve block of the electrohydraulic servo valve in accordance with the invention can be made very compact in this manner. The electrohydraulic servo valve in accordance with the invention can therefore produce a great weight advantage over the servo valves known from the prior art. A unit valve block or a valve block of steel and not necessarily of aluminum or titanium can thus be manufactured, which substantially reduces the cost expenditure for the manufacture of such servo valves.

In accordance with the invention, at least one flow passage, with which the jacket surface of the control slide valve sleeve is provided, is formed in groove shape; however, a different design is likewise possible and conceivable. The groove can in this respect be U-shaped, V-shaped, or can also be rectangular or have a different shape. The groove is preferably designed open "at the top", i.e. toward the jacket surface of the control slide valve sleeve.

A particularly preferred embodiment of the servo valve in accordance with the invention provides that a plurality of flow passages are formed on the jacket surface of the control slide valve sleeve, with them being able to have different dimensions and preferably being arranged symmetrical to one another on the jacket surface. In this respect, the flow passages can be formed centrally and/or at the two ends of the control slide valve sleeve and can have the same or different dimensions.

In accordance with the invention, the control slide valve sleeve has both flow passages which serve the control of the control slide valve and flow passages which sere the control of a component to be controlled by the servo valve, such as an actuator.

In this respect, the number of components of the servo valve in accordance with the invention is substantially reduced and the error rate in manufacture is thereby minimized.

The second stage of the electrohydraulic servo valve is preferably designed as an independent housing which is connected to the housing of the pilot stage. This first-named housing is also called a valve block. The valve block has hydraulic bores. The flow passages provided at the control slide valve sleeve take over the function of the hydraulic bores at least in part or are in communication therewith.

A preferred embodiment of the electrohydraulic servo valve in accordance with the invention provides that the control slide valve sleeve is arranged in the valve block such that it is partly or fully surrounded by the valve block. The connection of the control slide valve sleeve in the valve block in this respect preferably takes place via a press fit. The control slide valve sleeve is pressed axially in the valve block in this respect. A radial press fit of the control slide valve sleeve in the valve block can also take place by the axial press fit. The sealing gap is thereby set to a minimum matched to the operating conditions.

The control slide valve sleeve preferably simultaneously also serves as a seal between the individual circuits. The valve block and the control slide valve sleeve in this respect advantageously have the same coefficient of expansion, i.e. the same material pairing. The assembly time is substantially shortened by the preferably provided omission of a plurality of O-ring seals in the previously known electrohydraulic servo valves and by the pressing of the control slide valve sleeve into the valve block.

Hydraulic circuits whose sealing take place e.g. via press fits arise between the control slide valve sleeve and the valve block due to the formation in accordance with the invention of the electrohydraulic servo valve in which the control slide valve sleeve is provided with flow passages for transferring control flow (fluid flow for controlling the control slide valve) ad volume flow (fluid flow for controlling a consumer). The sealing of the individual hydraulic circuits between the control slide valve sleeve and the valve block can preferably take place via especially provided seals.

The control slide valve sleeve is preferably formed at its two ends such that it has grooves or other receivers at which a respective seal, preferably an O-ring seal, is attached so that no leak can occur.

The power stage of the servo valve is preferably of block design with connector ports formed at the lower side of the block, with the flow passages of the control slide valve sleeve being hydraulically connected to the respective connector ports. The hydraulic fluid is thus transferred to or from the ports of the power stage F, R, C1, C2 via the flow passages. Further flow passages serve the transfer of the control pressures of the first stage which move the control slide valve to and fro.

The valve block surrounding the control slide valve sleeve can comprise steel, titanium or aluminum. The control slide valve sleeve can also comprise steel, titanium or aluminum. A titanium or steel design is in this respect particularly preferred for such applications due to the high strength with simultaneously a high corrosion resistance. On the other hand, the valve blocks and control slide valve sleeves manufactured from steel have a longer service life in comparison with those which comprise titanium. However, the much lower price also speaks in favor of the use of steel and aluminum.

Due to the high precision and corrosion resistance and to the relative small dimensions and, not least, due to the inexpensive manufacture, the electrohydraulic control valve in accordance with the invention is particularly suitable for aviation applications.

The present invention furthermore relates to an actuator which is connected to the named ports of the servo valve such that the actuator can be controlled by the servo valve.

The actuator can have a housing and/or a valve block and the second stage of the servo valve can be received in the named housing and/or in the named valve block of the actuator.

The present invention further relates to an aircraft having at least one actuator and/or servo valve in accordance with the invention which serves the control of one or more components of the aircraft, in particular of an airplane.

BRIEF DESCRIPTION OF THE DRAWINGS

The present invention will now be explained in more detail with reference to an embodiment and to the drawing. There are shown.

DESCRIPTION OF THE PREFERRED EMBODIMENTS

Figure 1:
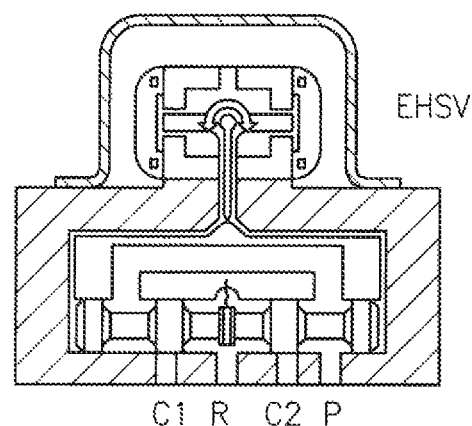
FIG. 1: a sectional representation through an electrohydraulic servo valve.
Figure 2:
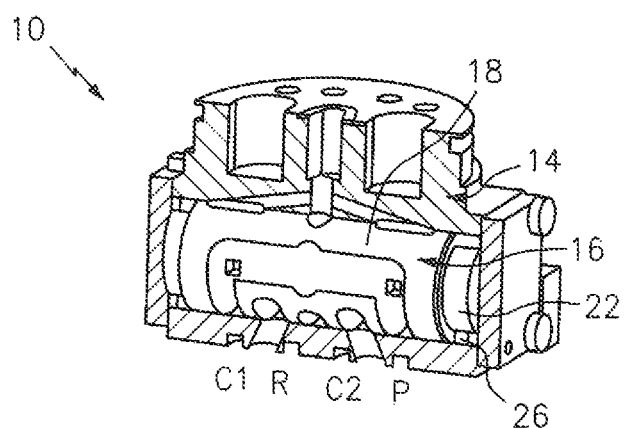
FIG. 2: a sectional representation of an electrohydraulic servo valve in accordance with the invention in the region of the power stage in accordance with an embodiment.

FIG. 2 shows a sectional representation of an electrohydraulic servo valve 10 in accordance with the invention which is only shown in the region of a second stage which works as a power stage. The pilot stage is not shown here, but is similar to the one shown in FIG. 1. The power stage has a housing which is called a valve block 14 below.

Furthermore, the power stage has a control slide valve sleeve 16 in which a control slide valve, not shown here, is arranged movable laterally to and fro. The control slide valve is in this respect moved proportionally to the electric input signal of the pilot stage by means of the volume flow by deflection of the pilot stage which is not shown here and which is also called a first stage.

The control slide valve is moved by the pilot stage in dependence on the electric input signal and allows the volume flow to a consumer such as an actuator to be controlled exactly in dependence on its position.

Figures 3A, 3B:
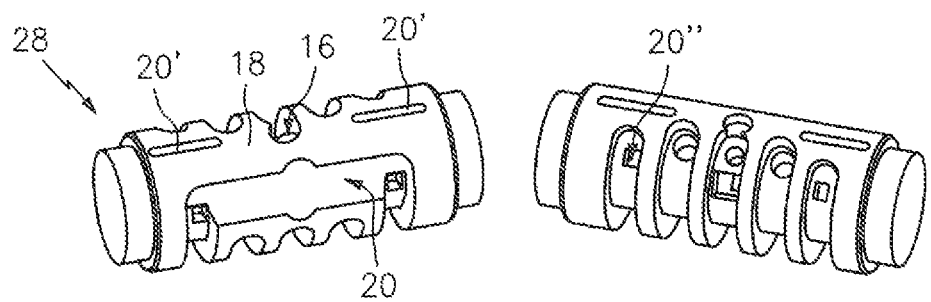
FIGS. 3A, 3B: a schematic perspective representation of a control slide valve sleeve of the electrohydraulic servo valve in accordance with FIG. 2.

The control slide valve sleeve 16 furthermore has a jacket surface 18 on which—as shown in the further FIGS. 3A and 3B—groove-shaped flow passages 20, 20', 20" are formed for transferring control flow and volume flow. The hydraulic fluid is transferred via these groove-shaped flow passages 20, 20', 20" from and/or to the ports P (pump), R (return), C1 (chamber 1 of the actuator) and C2 (chamber 2 of the actuator) of the power stage. In this respect, further flow passages serve the transfer of the control pressures of the first stage, i.e. from and/or to the control slide valve, so that the control slide valve can for example, preferably be moved in translation in the horizontal direction or in another manner.

As can be seen from FIGS. 3A and 3B, two of the flow passages 20' are provided at both ends 28 of the control slide valve sleeve 16, with them being formed in slit form and being arranged with mirror symmetry to one another.

Further flow passages 20" are shown in FIG. 3B which are likewise formed at both ends 28 of the control slide valve sleeve 16 in this embodiment. Another arrangement of the flow passages is naturally likewise possible.

A further flow passage 20 is, as shown in FIG. 3A, spaced apart from the flow passages 20' and is formed approximately at the center of the control slide valve sleeve 16, with this flow passage being formed as an elongate groove which extends along the longitudinal axis of the control slide valve sleeve 16.

The control slide valve sleeve 16 is formed in cylindrical shape and is inserted in the valve block 14 with a press fit. In this respect, the valve block 14 has a cylindrical cut-out so that the control slide valve sleeve 16 is received in the interior of the valve block 14. The control slide valve sleeve 16 simultaneously serves as a seal between the individual circuits.

Furthermore, the control slide valve sleeve 10 and the valve block 14 are preferably manufactured from the same material so that they have the same coefficient of expansion in this respect, steel, aluminum or titanium, or also other metals and their alloys can be considered.

As shown in FIG. 2, the control slide valve sleeve 16 has at both its ends of a respective groove 22 onto which a respective seal, here an O-ring seal 20, is attached. A design without seals is also generally possible since the seal is or can already be achieved by the press fit. However, one or more seals may be present for reasons of redundant design.

The valve block 14 of the power stage of the servo valve 10 has connector ports C1, R, C2, P which are formed at its lower side at which a consumer, in particular an actuator, can be connected. In this respect, the flow passages 20, 20', 20" of the control slide valve sleeve 16 are in communication with the connector ports so that the hydraulic liquid can be transferred to the connector ports P, R, C1 and C2 of the power stage.

The valve block 14 only has hydraulic passages which lead to the passages 20' of the slide control valve 16 as well as passages to the named connectors, but no passages which lead from and/or to the control slide valve. These passages are a component of the control slide valve sleeve 16 in this embodiment.

The invention claimed is:

1. A servo valve, having
a first stage which works as a pilot stage, and
a second stage which works as a power stage, wherein
the second stage has a valve block (14) and a control slide valve sleeve (16) arranged in the valve block (14) and having a jacket surface (18),
the control slide valve sleeve (16) has a main longitudinal axis and, including the jacket surface (18), is provided with a plurality of flow passages (20, 20', 20") arranged for transferring control flow and volume flow of fluid,
a control slide valve is movably arranged within the control slide valve sleeve (16), with position of the valve within the control slide valve sleeve (16) controlled by flow of the fluid through said passages (20, 20', 20") of the control slide valve sleeve (16),
at least one of the flow passages (20, 20', 20") is formed by a pair of grooves (20', 20') arranged as spaced apart, parallel, oblong slits directly on top of an outermost surface of the jacket surface (18) of the control slide valve sleeve (16) with mirror symmetry to one another and main longitudinal axes of both said grooves (20', 20') extending one after another and aligned in parallel with the longitudinal axis of the control slide valve sleeve (16) for transferring the control fluid flow,
a radial interference press fit is provided between the control valve slide sleeve (16) and the valve block (14), with the control valve slide sleeve (16) arranged in and surrounded by the valve block (14) and pressed in the valve block (14),
hydraulic circuits arise between the control slide valve sleeve (16) and the valve block (14), and additional flow passages (20") are formed near both opposite ends (28) of the control slide valve sleeve (16).

2. A servo valve in accordance with claim 1, wherein said plurality of flow passages (20, 20', 20") are formed on the jacket surface (18) of the control slide valve sleeve (16), having different dimensions and being arranged symmetrically to one another on the jacket surface (18).

3. A servo valve in accordance with claim 1, additionally comprising at least one seal for sealing the hydraulic circuits arising between the control slide valve sleeve (16) and the valve block (14).

4. A servo valve in accordance with claim 1, wherein the control slide valve sleeve (16) has grooves or recesses (22) at two opposite ends (28) on which a respective O-ring seal (26) is attached.

5. A servo valve in accordance with claim 1, wherein the valve block (14) of the power stage of the servo valve (10) has connector ports (C1, R, C2, P) which are formed at a lower side of the valve block (14), with the flow passages (20, 20', 20") of the control slide valve sleeve (16) being in communication with the connector ports (C1, R, C2, P).

6. A servo valve in accordance with claim 1, wherein the valve block (14) surrounding the control slide valve sleeve (16) comprises steel, titanium or aluminum.

7. A servo valve in accordance with claim 1, wherein the control slide valve sleeve (16) comprises steel, titanium or aluminum.

8. An actuator for controlling one or more flaps of an aircraft, wherein the actuator is connected to the servo valve in accordance with claim 1 wherein the actuator is controlled hydraulically by the servo valve.

9. The actuator in accordance with claim 8, wherein the actuator has a housing and/or a valve block; and the second stage of the servo valve is integrated in the housing and/or in the valve block of the actuator.

10. An aircraft having at least one servo valve in accordance with claim 1.

11. A servo valve in accordance with claim 1, comprising a further flow passage (20) spaced apart from a plane of the mirror image flow passages (20', 20') is formed approximately at a center of the control slide valve sleeve (16) as an elongate groove extending along the longitudinal axis of the control slide valve sleeve (16) and parallel to the mirror image flow passages (20', 20').

12. A servo valve in accordance with claim 11, wherein the opposite ends (28) of the control valve sleeve (16) each have a stepped, smaller outermost diameter (22) extending circumferentially around the ends (28) of the valve sleeve (16) to receive a respective O-ring seal (26) around an outermost circumference of the opposite valve sleeve ends (28) and circumferentially contacting the valve block (14).

13. A servo valve in accordance with claim 1, wherein the opposite ends (28) of the control valve sleeve (16) each have a stepped, smaller outermost diameter (22) extending circumferentially around the ends (28) of the valve sleeve (16) to receive a respective O-ring seal (26) around an outermost circumference of the opposite valve sleeve ends (28) and circumferentially contacting the valve block (14).

14. A servo valve in accordance with claim 1, wherein the position of the valve within the control slide valve sleeve (16) is controlled solely by flow of the fluid through said passages (20, 20', 20") of the control slide valve sleeve (16).

15. A servo valve having
- a first stage which works as a pilot stage, and
- a second stage which works as a power stage, wherein
- the second stage has a valve block (14) and a control slide valve sleeve (16) arranged in the valve block (14) and having a jacket surface (18),
- the control slide valve sleeve (16) including the jacket surface (18) is provided with a plurality of flow passages (20, 20', 20") arranged for transferring control flow and volume flow of fluid,
- a control slide valve is movably arranged in the control slide valve sleeve (16),
- at least one of the flow passages (20, 20', 20") is formed by a pair of grooves (20', 20') arranged as spaced apart, parallel slits in the jacket surface (18) of the control slide valve sleeve (16) with mirror symmetry to one another and both extending one after another along a longitudinal axis of the control slide valve sleeve (16) and arranged for transferring the control fluid flow,
- a press fit is provided between the control valve slide sleeve (16) and the valve block (14), with the control valve slide sleeve (16) arranged in the valve block (14) and pressed in the valve block (14)
- hydraulic circuits arise between the control slide valve sleeve (16) and the valve block (14), with said press fit sealing the hydraulic circuits,
- additional flow passages (20") are formed near both opposite ends (28) of the control slide valve sleeve (16),
- additionally comprising
- a further flow passage (20) spaced apart from a plane of the mirror image flow passages (20', 20') is formed approximately at a center of the control slide valve sleeve (16) as an elongate groove extending along the longitudinal axis of the control slide valve sleeve (16) and parallel to the mirror image flow passages (20', 20'), and
- the further flow passage (20) intercommunicates at opposite ends with two outermost grooves extending in a radial direction along an outer circumferential exterior of the control valve sleeve (16).

16. A servo valve in accordance with claim 15, wherein the opposite ends (28) of the control valve sleeve (16) each have a stepped, smaller outermost diameter (22) to receive a respective O-ring seal (26) around an outermost circumference of the opposite valve sleeve ends (28).

* * * * *